Dec. 20, 1960 W. NAEGELI 2,964,806
WIPER FOR TOP ROLLS OF DRAFTING ARRANGEMENTS
Filed April 6, 1959 2 Sheets-Sheet 1

INVENTOR.
WERNER NAEGELI
BY
K. A. Mayr
ATTORNEY

Dec. 20, 1960  W. NAEGELI  2,964,806
WIPER FOR TOP ROLLS OF DRAFTING ARRANGEMENTS
Filed April 6, 1959  2 Sheets-Sheet 2
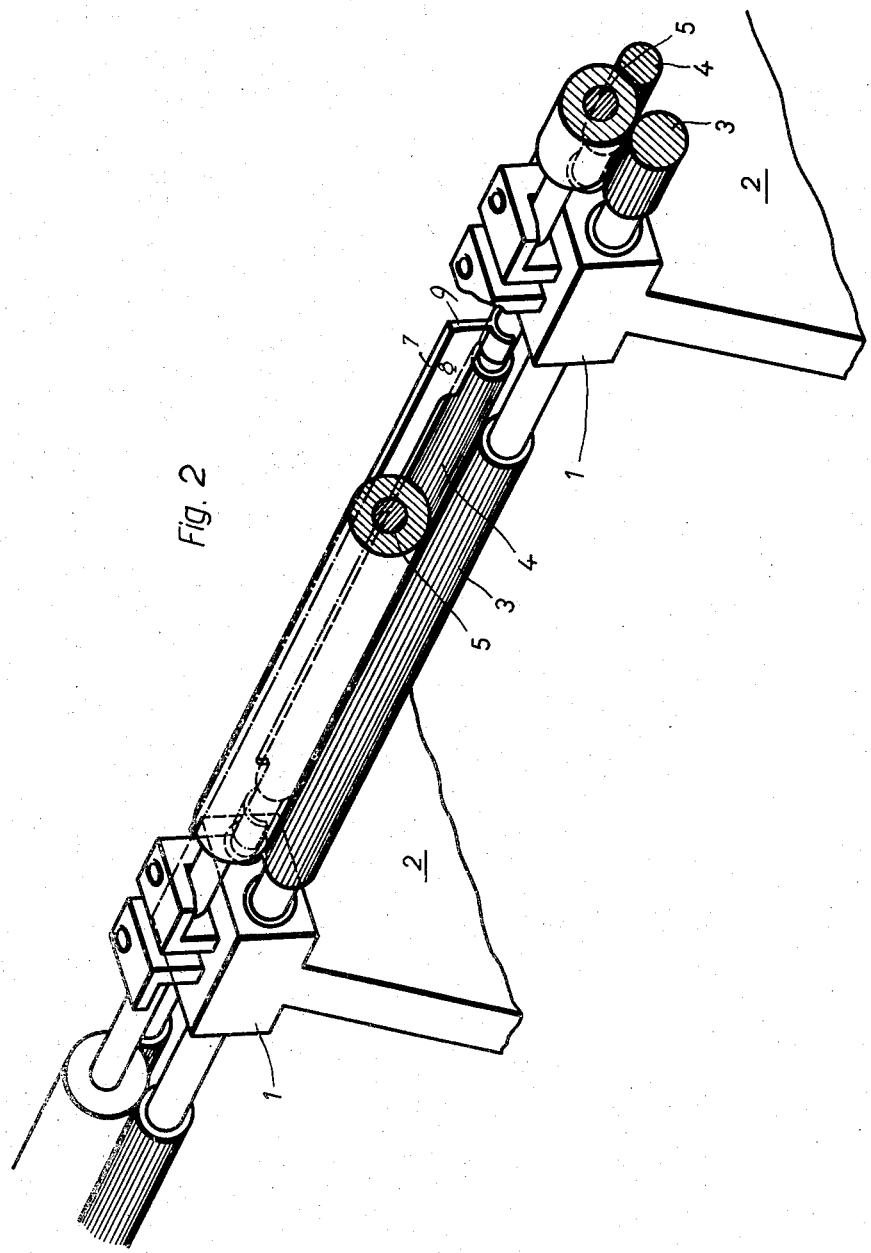
INVENTOR.
WERNER NAEGELI
BY
K. B. Mayr
ATTORNEY _United States Patent Office_ 2,964,806
Patented Dec. 20, 1960

2,964,806

WIPER FOR TOP ROLLS OF DRAFTING ARRANGEMENTS

Werner Naegeli, Winterthur, Switzerland, assignor to Joh. Jacob Rieter & Co. Ltd., Winterthur, Switzerland, a corporation of Switzerland Filed Apr. 6, 1959, Ser. No. 804,248

Claims priority, application Switzerland Apr. 8, 1958

7 Claims. (Cl. 19—139)

The present invention relates to a wiper for rubber covered top rolls of drafting arrangements on spinning machines, particularly on preparatory machines.

Many kinds of wipers for the top rolls of drafting arrangements have been proposed which wipers are made of felt, plush, wool, synthetic rubber and the like and are for the purpose of removing and, if desired, accumulating fibres which leave the sliver and stick to the surface of the roller. In the conventional arrangements the necessary pressure for urging the wiper against the roller is produced by means of elastic pillows, springs, and the like.

It is an object of the present invention to provide a wiper for the top rolls of drafting arrangements whereby no additional means for pressing the wiper against the roll are required. The wiper according to the invention includes a relatively heavy wiper blade made of wear-resisting material and resting, by means of suitable feet, on portions of the respective lower drawing roller which are plain or not fluted. The friction moment produced by the contact with the rotating roller which moment can be adapted to the desired pressure of the wiper blade on the top roller by making the gliding surfaces of suitable material. The wiper blade is preferably provided with a plane upper surface and with a concave cylindrical surface which gradually engages the top roller. The line of intersection of the plane upper surface and of the cylindrical surface forms the wiping edge of the wiper.

An additional torque can be produced by loading, i.e. making heavier, the wiper blade and feet unit on the respective side.

The wiper according to the invention is particularly effective, if settling of fibre material on top of the wiper blade which material has been wiped off the top roller, can be prevented. This can be done by sucking the fibre material away, particularly in a direction parallel to the top surface of the wiper as is shown in my copending application Serial No. 752,462, filed August 1, 1958. With this arrangement no fibre material is accumulated and no so-called brows are formed on the wiper edge.

Drafting arrangements of preparatory spinning machines are usually provided with very light guides for the sliver which rest freely on the sliver between two roller groups of a drafting field and are not otherwise guided or supported. The wiper according to the invention replaces these guides, the wiper blade being provided with a recess which is open at the bottom of the blade and which is so shaped as to laterally confine the sliver and to guide it into the nip of the neighboring roller pair.

The novel features which are considered characteristic of the invention are set forth with particularity in the appended claims. The invention itself, however, and additional objects and advantages thereof will best be understood from the following description of an embodiment thereof when read in connection with the accompanying drawing, in which:

Fig. 2 is a perspective part sectional illustration of a delivery roller group including a wiper according to the invention.

Like parts are designated by like numerals is all figures of the drawing.

Figure 1:
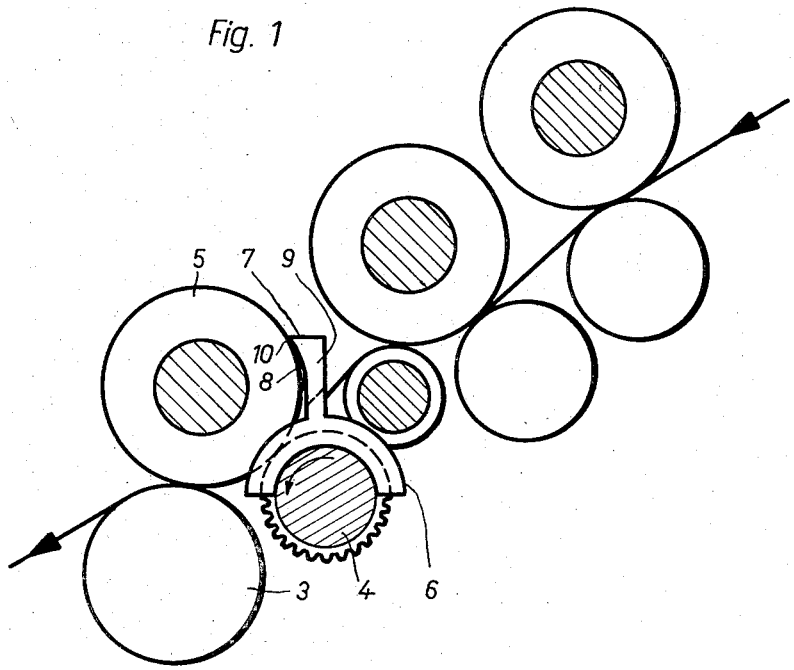
Fig. 1 is a diagrammatic longitudinal sectional view of a drafting arrangement including a wiper according to the invention.

Referring more particularly to the drawing, numeral 1 (Fig. 2) designates a head of a roller stand 2 supporting drawing rollers 3 and 4 and a rubber covered top roller 5 resting on the rollers 3 and 4. The top roller is weighted, for example, as shown in my copending application Serial No. 797,968 filed March 9, 1959. The roller group in connection with which the wiper according to the invention is used corresponds to a delivery roller trio of said application Serial No. 797,968.

Figure 3:
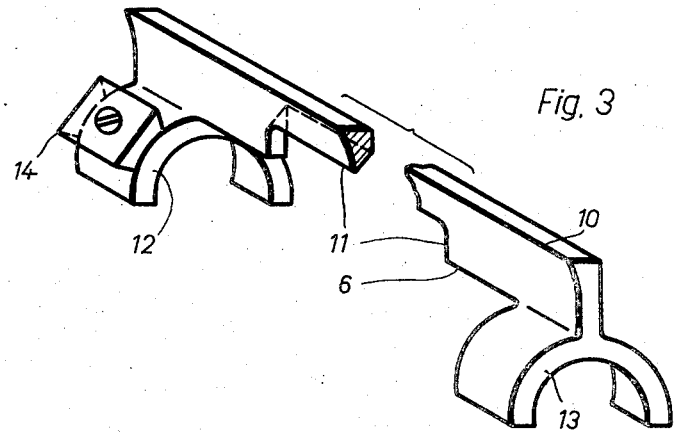
Fig. 3 is a perspective illustration of a wiper according to the invention.

A wiper and sliver guide 6 includes a brass blade 9 having a plane top surface 7 and a cylindrical concave surface portion 8 which gradually approaches the surface of the top roller 5 so that the top of blade 9 extends forward and is thicker than the lower portion of the blade. The thus formed wiper edge 10 rests on the lower portion of the upper half of the top roller. The bottom edge of the blade 9 has a recess 11 (Fig. 3) through which the sliver passes and which directs the sliver toward the nip of the rollers 4 and 5. The recess also determines the width of the sliver. The ends of the blade 9 are provided with feet 12 and 13 which surround not more than one half of the circumference of portions of the drawing roller 4 which portions are not fluted. The extent of the feet around the drawing roller 4 is so chosen that the feet are securely borne by the roller and will not leave the roller 4. Since the latter rotates in counterclockwise direction a likewise directed frictional moment is imparted to the feet of the wiper blade whereby the edge of the latter is gently pressed against the top roller 5. This frictional moment depends on the weight of the wiper blade unit and on the material of which the bearing surface portions of the wiper feet and of the roller 4 are made. Brass has been found to be a suitable bearing material for the wiper feet.

For increasing the pressure of the wiper blade against the top roller, a weight 14 may be mounted on the forward portion of one or both wiper feet.

I claim:

1. A wiper for a top roller of a drafting arrangement which top roller forms a nip with a drawing roller, comprising a relatively heavy wiper blade leaning against the top roller in parallel relation thereto, and resting on plain cylindrical surface portions of the drawing roller whereby the torque imparted to said blade by the frictional engagement between said blade and the drawing roller gently presses said blade against the top roller.

2. A wiper as defined in claim 1 wherein said wiper blade has an edge portion resting against the top roller in parallel relation thereto.

3. A wiper as defined in claim 1 wherein said wiper blade has a plane top surface and a concave cylindrical side surface gradually approaching the top roller and intersecting said top surface for forming an edge resting against the top roller in parallel relation thereto.

4. A wiper as defined in claim 1 wherein said wiper blade has foot portions at the ends of the blade which foot portions rest on the drawing roller.

5. A wiper according to claim 4, said foot portions having bearing surface portions surrounding not more than one half of the plain cylindrical surface portions of the drawing roller.

6. A wiper according to claim 5 including a weight connected to the side of at least one of said foot portions which side faces the rollers.

7. A wiper as defined in claim 1 wherein said wiper blade has a bottom edge provided with a recess for guiding the sliver to the nip of the rollers and laterally confining the sliver.

No references cited.